(12) United States Patent
Vanhoutte et al.

(10) Patent No.: US 7,819,977 B2
(45) Date of Patent: Oct. 26, 2010

(54) SPRAY-DRIED STARCH HYDROLYSATE AGGLOMERATE PRODUCT AND METHOD FOR PREPARING A SPRAY-DRIED STARCH HYDROLYSATE AGGLOMERATE PRODUCT

(75) Inventors: Helena Vanhoutte, Aalst (BE); Amale Nezzal, Aalst (BE); Bart Moyson, Aalst (BE)

(73) Assignee: Syram Belgium nv, Aslst (BE)

( * ) Notice: Subject to any disclaimer, the term of this patent is extended or adjusted under 35 U.S.C. 154(b) by 1101 days.

(21) Appl. No.: 10/590,019

(22) PCT Filed: Feb. 19, 2004

(86) PCT No.: PCT/EP2004/001744

§ 371 (c)(1),
(2), (4) Date: Aug. 21, 2006

(87) PCT Pub. No.: WO2005/079595

PCT Pub. Date: Sep. 1, 2005

(65) Prior Publication Data

US 2007/0190228 A1   Aug. 16, 2007

(51) Int. Cl.
*C08B 30/12* (2006.01)
*C08B 30/18* (2006.01)
*B01D 1/18* (2006.01)

(52) U.S. Cl. ............................ 127/29; 127/58; 159/4.4
(58) Field of Classification Search .................. 159/4.4; 127/29, 32, 58, 612, 63, 71
See application file for complete search history.

(56) References Cited

U.S. PATENT DOCUMENTS

| 3,706,598 | A |   | 12/1972 | Carrell |
|---|---|---|---|---|
| 4,280,851 | A |   | 7/1981 | Pitchon et al. |
| 4,447,532 | A | * | 5/1984 | Coker et al. .................. 435/99 |
| 4,871,398 | A |   | 10/1989 | Katcher |
| 4,954,178 | A |   | 9/1990 | Caton |
| 5,131,953 | A | * | 7/1992 | Kasica et al. .................. 127/65 |
| 5,209,821 | A | * | 5/1993 | Shaw et al. ................. 159/4.01 |
| 5,904,941 | A | * | 5/1999 | Xu et al. ........................ 426/52 |

FOREIGN PATENT DOCUMENTS

EP    1166645    1/2002

* cited by examiner

*Primary Examiner*—David M Brunsman
(74) *Attorney, Agent, or Firm*—James Creighton Wray; Meera P. Narasimhan

(57) ABSTRACT

A spray-dried starch hydrolysate agglomerate product has a dextrose equivalent between 5 and 35, a moisture content <6% by weight, an unpacked bulk density between 0.4 and 0.6 g/cm$^3$, compressibility less than 10%, particle sizes <5% by weight is >500 micron and <5% by weight is <53 micron, average particle size between 150-250 micron, a mechanical stability of >95%, a static angle of repose <45°, and dissolution speed <180 seconds. Spraying onto a solid powder material, a liquid material atomised by means of one or more two-fluid nozzles. Fluid heats and conveys this material. Injecting the solid powder in the top of the drying tower, the trajectory of the powder crosses the spray pattern of the atomised liquid. The liquid is atomised by one or more two-fluid nozzles is a starch hydrolysate solution using steam as the atomizing fluid.

19 Claims, No Drawings

SPRAY-DRIED STARCH HYDROLYSATE AGGLOMERATE PRODUCT AND METHOD FOR PREPARING A SPRAY-DRIED STARCH HYDROLYSATE AGGLOMERATE PRODUCT

This application claims the benefit under 35 U.S.C. 371 of PCT Application No. PCT/EP2004/001744 filed Feb. 19, 2004, which is hereby incorporated by reference in its entirety.

The invention relates on the one hand to a spray-dried starch hydrolysate agglomerate product. On the other hand, the invention relates to a method for preparing a spray-dried starch hydrolysate agglomerate product in a spray-drying tower, comprising spraying a liquid material onto a solid powder material, whereby the liquid material is atomised by means of one or more two-fluid nozzles using a fluid for heating and conveying this material, and whereby the agglomerated spray-dried starch hydrolysate is produced by injecting the solid powder material in the top of the drying tower in such a way that the trajectory of the powder crosses the spray pattern of the atomised liquid material.

Starch hydrolysate products are obtained by the partial hydrolysis of cereal, root or tuber starches. Depending on the degree of hydrolysis, as expressed by the dextrose equivalent (DE), one speaks about maltodextrins (DE<20) or glucose (corn) syrups (DE>20). These starch hydrolysates can be obtained via different manufacturing processes, including a one step enzymatic hydrolysis, a two-step enzyme-enzyme process or a two-step acid-enzyme process.

Maltodextrins are mainly available commercially in a spray-dried, particulate form. Some of the glucose syrups having a DE between 20 and 30 are also available in a spray-dried particulate form and are known as "corn syrup solids".

These powder products are used as dispersing aids, flavour carriers, bulking agents, humectants, viscosifiers and other functional ingredients. They can work in a wide variety of applications—from dry mixes to fillings and from sauces to beverages.

The physical characteristics of the powder products are of great importance for their use in this wide range of applications.

Important physical properties related to these powders are:
bulk density (loose and tapped) and related to these, compressibility;
average particle size;
particle size distribution;
mechanical stability;
flowability;
dispersability and related to that, dissolution speed.

These physical properties are very important with regard to the handling properties of these powder products, but also with regard to their use in a range of applications.

Today, two major types of starch hydrolysate-based powders are encountered in the market.

A first type are the standard spray-dried powders which have a relatively high bulk density varying between 0.45-0.65 g/cm$^3$, an average low particle size and a broad particle size distribution. The relatively high bulk density makes these spray-dried powders suitable in the preparation of dry mixes, because phase de-mixing of the different components in these compositions is thereby limited or even prevented. The relatively high bulk density further results in less voluminous packaging sizes thereby influencing positively transportation costs per weight unit. A major disadvantage however is the relatively high amount of fines (with particle size <100 micron), resulting in dusting problems and therefore safety risks, limited or bad flowability and increased compressibility.

In addition, these spray-dried powders are difficult to completely hydrate, i.e. to dissolve in water. Because of the fine particle size, such powders require high shear mixing and low rates of addition to the water, heating or other dissolution liquid in order to avoid the formation of small lumps, which are wet on the outside and dry within.

In order to overcome the above cited problems related to dusting and wetability, a second type of starch hydrolysates, i.e. spray-dried starch hydrolysate agglomerated (powder) products, were developed.

Agglomeration of the starch hydrolysate particles thereby resulted in increased particle sizes. The larger, more porous structures thereby increase the void volume, and create a lower external surface-to-volume ratio. This improves flowability, dispersion and wetability, and also decreases dusting. A drawback to this treatment is that it reduces the bulk density of the starch hydrolysate powder products, in particular the maltodextrin powder products, to values of about 0.15-0.4 g/cm$^3$. Another disadvantage observed is the reduced mechanical stability.

Different processes are known for preparing such spray-dried starch hydrolysate agglomerate products. Standard prior art agglomeration processes are for instance described in Food Product Design (May 1997): "Spray drying: innovative use of an old process" by R. C. Deis, and in Zeitschrift for Lebensmitteltechnik (October 1992): "Recent advances in agglomeration during spray-drying." by E. Refstrup.

In order to compensate for the above cited drawbacks, in U.S. Pat. No. 4,810,307, a process is described whereby a spray-dried maltodextrin powder is blended with a volatile liquid other than water (e.g. 95% ethanol). The resulting blend is then compacted in a roller compacter without extraneous lubricant. The formed sheet is then broken and sieved. According to the applicant of U.S. Pat. No. 4,810,307, the resulting particles are non-spherical, do have a bulk density comparable to the starting material, a good solubility and no flow or dusting problems.

However, particle size distribution is quite broad, while the percentage of particles larger than 500 micron (+30 mesh) is much too high, as shown in example 2 of U.S. Pat. No. 4,810,307. Indeed, too large quantities of such large particles result in "white spots" in the applications and this is an undesirable effect. In addition, compressibility of the resulting powders is quite high, thereby influencing negatively handling properties related to storage and transportation of the powders.

Apart from these disadvantageous properties, it is clear for a man skilled in the art that the use of liquids such as ethanol creates some safety constraints during the manufacturing process.

An alternative is offered by the products obtained via the process disclosed in U.S. Pat. No. 3,706,598. In this patent application, solid, glass-like starch hydrolysate products having a DE of from about 10 to about 25, a water content of less than 15% by weight and a bulk density of at least about 0.65 g/cm$^3$ (40 pounds per cubic foot) are produced by concentrating a hydrolysed starch conversion liquor, heating the liquor in a plate heat exchanger, superheating minute droplets of the liquor and cooling to solidification. The applicant of U.S. Pat. No. 3,706,598 discloses that the corresponding products have excellent wetability and solubility in water. However, no concrete figures are provided. Furthermore, the density of the products obtained varies between 0.65-0.9 g/cm$^3$ (55 pounds per cubic foot). Because of the fact that in the process as described in this patent application, the solidified product is ground or milled to an extent sufficient to pass through a 20 mesh screen, it is obvious for a man skilled in the art that this results in a disadvantageous quite broad particle size distribution, while the percentage of particles which are larger than 500 micron is too high. In addition, the moisture content of the products disclosed is too high while the described manufacturing process is less attractive.

As already indicated above, the compacted powders and the glass-like products obtained by these processes do show one or more shortcomings which are related to their physical properties (density, mechanical stability, particle size and/or moisture content) and to the processes used for their manufacture.

The methods disclosed hereunder are related to the preparation of spray-dried pregelatinised agglomerated starch-based products.

In U.S. Pat. No. 4,871,398, a continuous method is described for preparing pre-gelatinised spray-dried starch agglomerate products. This method uses two or more capped, two-fluid nozzles of the type described in U.S. Pat. No. 4,208,851. In this process, two or more spray-cook nozzles (or two-fluid nozzles) are aligned in a drying tower such that their spray patterns intersect. The point of intersection has to be distant enough from the nozzles to avoid globbing or clumping and close enough to the nozzles so that the surface of the particles are tacky enough to effect adhesion and a build-up of agglomerates.

In U.S. Pat. No. 4,208,851, a process and an apparatus are described for cooking or gelatinising a material which is normally difficult to cook and spray dry because of the formation of high viscosities during cooking, so that an easily dryable, uniformly cooked and finely-sized product is obtained thereby. The material is initially mixed in an aqueous solvent (a slurry is formed) and then atomised into an enclosed chamber to form a relatively fine spray which may be uniformly cooked or gelatinised. A heating medium (e.g. steam) is interjected into the atomised material in the chamber to cook the material. The chamber contains a vent aperture to allow the heated atomised material to exit the chamber, with the size and the shape of the chamber and the vent aperture being effective to maintain the temperature and moisture content of the material for a period of time sufficient to cook and gelatinise the material.

In EP 1 166 645, agglomerated spray-dried starch based products and dry-mixes based on these agglomerated spray-dried starch based products are described. The agglomerated starch-based product is a homogeneous powder wherein each powder particle is an agglomeration of randomly distributed fine grains. As described in EP 1 166 645, these spray-dried agglomerated starch-based products can be prepared by spray-cooking of unmodified (native) or modified starch and maltodextrin in an apparatus such as is described in U.S. Pat. No. 4,280,851. In the process as described in EP 1 166 645, the maltodextrin is injected in the top of the spraying tower in such a way that the trajectory of the dry powder crosses the spray pattern of the spray-cooked starch in order to produce spray-dried agglomerated particles.

The purpose of the invention is therefore to provide a spray-dried starch hydrolysate agglomerate product which combines the advantageous properties of standard spray-dried starch hydrolysates and known spray-dried starch hydrolysate agglomerate products.

This purpose of the invention is obtained by providing a spray-dried starch hydrolysate agglomerate product, in which the starch hydrolysate has the following properties:

a dextrose equivalent (DE) between 5 and 35;
a moisture content of <6% by weight;
an unpacked bulk density between 0.4 and 0.6 g/cm$^3$;
a compressibility of less than 10%;
a particle size distribution whereby less than 5% by weight is bigger than 500 micron and less than 5% by weight is smaller than 53 micron;
an average particle size of between 150-250 micron;
a mechanical stability of >95%;
a static angle of repose (SAOR) of less than 45°, as a measure for flowability; and
a dissolution speed of <180 seconds.

In this way, a spray-dried starch hydrolysate agglomerate product is obtained which has a high bulk density, reduced volume, a high mechanical stability, low dusting, high dissolution speed, higher mean particle size and better particle size distribution.

In a preferred embodiment of a spray-dried starch hydrolysate agglomerate product according to the invention, the starch hydrolysate has the following properties:

a DE between 5 and 35;
a moisture content of <6% by weight;
an unpacked bulk density between 0.45 and 0.55 g/cm$^3$;
a compressibility of less than 5%;
a particle size distribution whereby less than 3% by weight is bigger than 500 micron and less than 3% by weight is smaller than 53 micron;
an average particle size of between 175-230 micron;
a mechanical stability of >97%;
a SAOR of less than 40°; and
a dissolution speed of <120 seconds.

In a more preferred embodiment of a spray-dried starch hydrolysate agglomerate product according to the invention, the starch hydrolysate has a dissolution speed of <90 seconds.

A spray-dried starch hydrolysate agglomerate product according to the invention preferably has a DE between of 10 to 22.

Another purpose of the invention is to provide a method for preparing a spray-dried starch hydrolysate agglomerate product in a spray-drying tower according to the preamble of claim 1, whereby the thus obtained spray-dried starch hydrolysate agglomerate products do show the combined properties of standard spray-dried starch hydrolysates and known spray-dried starch hydrolysate agglomerate products, i.e. a high bulk density, reduced volume, a high mechanical stability, low dusting, high dissolution speed, higher mean particle size and better particle size distribution.

This purpose is realised by providing a method for preparing a spray-dried starch hydrolysate agglomerate product in a spray-drying tower, comprising spraying a liquid material onto a solid powder material, whereby the liquid material is atomised by means of one or more two-fluid nozzles using a fluid for heating and conveying this material, and whereby the agglomerated spray-dried starch hydrolysate is produced by injecting the solid powder material in the top of the drying tower in such a way that the trajectory of the powder crosses the spray pattern of the atomised liquid material, and wherein the liquid material which is atomised by one or more two-fluid nozzles is a starch hydrolysate solution, whereby this starch hydrolysate solution is atomised using steam as said fluid.

Although from EP 1 166 645, it is known to inject a maltodextrin powder in the top of a spraying tower in such way that the trajectory of this solid powder crosses the spray pattern of the spray-cook starch which exits one or more two-fluid nozzles in order to produce agglomerated particles, it is not obvious for a man skilled in the art to use the two-fluid nozzles to atomise a starch hydrolysate solution on a solid powder in order to produce a spray-dried starch hydrolysate agglomerate product having the combined properties of standard spray-dried starch hydrolysates and known spray-dried starch hydrolysate agglomerate products. The two-fluid nozzles as described in EP 1 166 645 are used for a totally different purpose, i.e. spray-cooking a starch slurry, and not for atomising a starch hydrolysate solution.

In a preferred method according to the invention, the starch hydrolysate solution has a concentration of 50-75% dry matter, and more preferably, of 65-75% dry matter.

In an advantageous method according to the invention, the steam has a pressure between 7 and 15 bar.

The weight ratio of steam versus starch hydrolysate solution (weight steam/weight hydrolysate solution) is within the range of 0.05 and 0.4, and preferably between 0.1 and 0.3.

The heating air which is introduced in the spraying tower has preferably a temperature between 160 and 300° C., and more preferably between 180 and 250° C.

In a preferred embodiment of a method according to the invention, the exiting air has a temperature between 90 and 120° C.

The ratio between the solid powder and the starch hydrolysate solution, on a dry weight basis, is preferably between 0.6 and 1.1, and more preferably between 0.8 and 1.

In a preferred method according to the invention, the dry powder is a starch hydrolysate powder.

Preferably, the starch hydrolysate powder is a spray-dried form of the starch hydrolysate solution.

This has the advantage that the starch hydrolysate powder consequently has a similar or equal composition as the starch hydrolysate solution.

In an advantageous method according to the invention, the agglomerated spray-dried starch hydrolysate particles is brought into a fluidised bed.

Further distinctive features and characteristics will be clarified in the following description and the following examples, which should be considered as being no restriction in the general scope of the invention as that appears from the above description and from the claims at the end of this text.

The spray-dried starch hydrolysate agglomerate product according to the invention, having the properties as described in the product claims, can be used at the same time for preparing dry mixes, as well as for preparing thickening solutions such as for meat, dairy, baby food or convenience food applications. In these applications, dissolution speed is very important. Improved handling properties with regard to bulk density, mechanical stability, dusting properties (safety) and flowability are of importance in the preparation of dry mixes, but also with regard to storage, dosing and mechanical transportation. As a consequence, such a product will simplify storage installations and transportation means at the customer, because only one type of product will need to be stored and transported.

In order to stabilise the above cited starch hydrolysates, they may be submitted to a state of the art hydrogenation process prior to the spray-drying step, thereby providing hydrogenated starch hydrolysates.

The properties of the spray-dried starch hydrolysates as described in the product claims are determined by means of the methods disclosed herewith:

The term DE (dextrose equivalent) refers to the reducing sugar content of the dissolved solids in a starch hydrolysate, as measured by the Lane-Eynon constant titre method. This method is fully described in ISO 5377.

The bulk density of the spray-dried starch hydrolysate agglomerate product is expressed as the unpacked bulk density. The unpacked bulk density is determined by weighing a quantity of spray-dried starch hydrolysate agglomerate product of the invention in a glass graduated cylinder of 250 ml. The unpacked density then corresponds to the ratio of the mass of the product and the volume of the product. Packed (tapped) density is then determined by packing the sample under standard conditions in an Erweka SVM22 volumeter. Tapped density is then determined after 50 strokes. Compressibility is expressed by the formula $C=(1-\rho_{unt}/\rho_t)*100\%$. Therein is $\rho_{unt}$ the untapped density, and $\rho_t$ the tapped density, as defined above.

Particle size distribution is determined by sieving 50 g of powder in a Retsch VE1000 shaking device containing sieves of 53, 100, 200, 300 and 500 micron, during 10 minutes using an amplitude of 1.5.

Average particle size is expressed as the mathematical mean particle size on weight basis of the different fractions obtained from the particle size distribution.

Mechanical stability is determined on an Alpine sieving apparatus 200 LS-N as the ratio of the weight of fraction of the spray-dried starch hydrolysate agglomerate product of the invention remaining on a 150 micron Alpine sieve after 30 minutes sieving and weight of the product on the same Alpine sieve after 5 minutes. Seiving is performed at an under pressure of 1500 Pa. The product sample was first sieved for 3 minutes on an ASTM Retsch sieve of 150 micron in order to remove small particles.

Flowability is expressed by the static angle of repose (SAOR). The method is described by ISO 8398:1989. Angle of repose is defined as the maximum angle in degrees at which a pile of material retains its slope.

Dissolution speed corresponds with the time needed to dissolve 20 g of product in 200 ml water at 5° C. in a beaker of 400 ml, whereby the mixture is continuously stirred with a magnetic stirrer at 300 rpm.

The method according to the invention for preparing a spray-dried starch hydrolysate agglomerate product may be performed in a spray-drying tower as disclosed in EP 1 166 645. However, also other types of spray-drying towers can be used to perform the method. The tower which is used in EP 1 166 645 comprises one or more two-fluid spraying nozzles as described in U.S. Pat. No. 4,280,851.

In the method according to the present invention, in the spray-drying tower, a starch hydrolysate is injected in the top of the tower in such a way that the trajectory of a solid powder, preferably a dry starch hydrolysate powder, crosses the spray pattern of a starch hydrolysate solution which is atomised by one or more two-fluid nozzles. The atomising process of the starch hydrolysate solution in the one or more two-fluid nozzles is performed by first atomising the starch hydrolysate solution into an enclosed chamber, then interjecting steam into the atomised starch hydrolysate solution in the enclosed chamber and finally enabling the atomised starch hydrolysate solution to exit the chamber through a vent aperture into the spraying tower.

In this particular process, the stream of fines of the starch hydrolysate powder which is injected in the top of the spraying tower is contacted with the sprays from the two-fluid nozzles, using conditions allowing the formation of the spray-dried starch hydrolysate agglomerate product of the invention.

Important parameters hereby are the concentration and composition of the starch hydrolysate to be agglomerated, the weight ratio of steam to hydrolysate solution, the steam pressure used in the nozzles, the temperature of the heating air in the spraying tower in which the particles are sprayed, the ratio between the starch hydrolysate powder injected in the top of the drying tower and the starch hydrolysate solution fed via the two-fluid nozzles, the feeding rate and the angle under which the spray patterns intersect.

The starch hydrolysate solution is thereby introduced in the two-fluid nozzles at a concentration of 50-75%, preferably 65-75% dry matter, while the weight ratio of steam to starch hydrolysate solution may vary between 0.05 and 0.4, preferably between 0.1 and 0.3. Steam pressure used may vary between 7 and 15 bar, while the temperature of the heating air which is introduced in the spraying tower is situated between 160 and 300° C., more preferably between 180 and 250° C. The temperature of the exiting air at the bottom of the spraying tower is between 80 and 125° C., more preferably between 90 and 120° C. The angle under which the spray patterns intersect will be such that contact of the particles occurs at a location where the particle surface is tacky enough to promote adherence of the particles, but not so close to the nozzle vent apertures that lumping of the spray-dried starch hydrolysate agglomerate product occurs. A.o. this angle will depend on the concentration and composition (DE) of the starch hydrolysate solution, on the circulating air temperature, on feed rate through the nozzles and on the ratio between the starch hydrolysate powder which is injected in the top of the spraying tower and the starch hydrolysate solution that is fed through the two-fluid nozzles. An advantageous ratio on dry weight basis is between 0.6 and 1.1, preferably between 0.8 and 1. The spray-dried starch hydrolysate agglomerate product can then be brought in a fluidised bed, where the powder is further dried and/or cooled and fines present removed via the air stream.

EXAMPLE 1

In this example, the advantageous properties of the product of the invention are illustrated by comparing a number of its properties with spray-dried starch hydrolysate agglomerate products currently commercialised.

Following commercially available products were tested: Glucidex 211T from Roquette Frères, C*Sperse 01321 from Cerestar Holding BV and Granadex SPG20 from AVEBE. Different parameters are shown in Table 2.

TABLE 2

|  | Glucidex 21IT | C*Sperse 01321 | Granadex SGP20 | Product of the invention |
|---|---|---|---|---|
| Loose ρ (g/l) | 400 | 474 | 358 | 486 |
| Tapped ρ (g/l) | 435 | 504 | 418 | 500 |
| Compressibility | 8% | 6% | 14% | 3% |
| PSD (% w/w) |  |  |  |  |
| >53µ | >99 | 94 | 91 | >99 |
| >200µ | 72 | 40 | 28 | 49 |
| >500µ | 6 | 2 | 2 | 2 |
| Average PSD (µ) | 270 | 185 | 155 | 220 |
| SAOR | 42° | 40° | 60–70° | 36° |
| Mechanical stability | 95% | 93% | 83% | >98% |
| Dissolution speed (sec) | 230 | 205 | 390 | 55 |

PSD: particle size distribution
SAOR: static angle of repose

EXAMPLE 2

In this example, dissolution speed at two different temperatures (5° C. and 22° C.) was compared of products of this invention versus state of the art products (see table 3). Non-agglomerated maltodextrins (18DE and 21DE), as well as agglomerated counterparts (C*Sperse 01318, C*Sperse 01321, Glucidex IT21) are compared with products of the invention.

TABLE 3

|  | Speed (sec) at 22° C. | Speed (sec) at 5° C. |
|---|---|---|
| 18DE invention | 115 | 120 |
| 21DE invention | 50 | 55 |
| Standard 18DE | 390 | 540 |
| Standard 21DE | 320 | 500 |
| Agglomerated: |  |  |
| Glucidex IT21 | 185 | 230 |
| C*Sperse 01318 | 190 | 205 |
| C*Sperse 01321 | 175 | 240 |

Results of this example clearly show the outstanding dissolution speed, compared to products already considered as having excellent dissolution properties.

EXAMPLE 3

Dissolution properties of the spray-dried starch hydrolysate agglomerated products of the invention and other spray-dried starch hydrolysate agglomerated products were compared to the values disclosed in U.S. Pat. No. 4,810,307 (see table 4). This patent application describes a process for improving solubility of maltodextrins while retaining relatively high densities. Solubility was expressed as the time needed to dissolve 1 g of product in 240 ml water, without stirring. Values disclosed in U.S. Pat. No. 4,810,307 varied between 5.5 minutes and 9 minutes.

In table 4, these results are compared with a product of the invention and with commercially available products.

TABLE 4

|  | Solubility (minutes) |
|---|---|
| 18DE product of the invention | 3.5 |
| U.S. Pat. No. 4,810,307 products | 5.5–9 |
| standard maltodextrin 15DE | >12 |
| agglomerated C*Sperse 01318 | 5.5 |
| agglomerated Glucidex IT21 | 6.8 |

From the above, it is clear that the products of the invention clearly show an improved solubilisation speed.

The invention claimed is:

1. Spray-dried starch hydrolysate agglomerate product, characterised in that the starch hydrolysate has the following properties:
   a dextrose equivalent (DE) between 5 and 35;
   a moisture content of <6% by weight;
   an unpacked bulk density between 0.4 and 0.6 g/cm$^3$;
   a compressibility of less than 10%;
   a particle size distribution whereby less than 5% by weight is bigger than 500 micron and less than 5% by weight is smaller than 53 micron;
   an average particle size of between 150-250 micron;
   a mechanical stability of >95%;
   a static angle of repose (SAOR) of less than 45°, as a measure for flowability; and
   a dissolution speed of <180 seconds.

2. Spray-dried starch hydrolysate agglomerate product according to claim 1, characterised in that the starch hydrolysate agglomerate product has the following properties:

a DE between 5 and 35;
a moisture content of <6% by weight;
an unpacked bulk density between 0.45 and 0.55 g/cm$^3$;
a compressibility of less than 5%;
a particle size distribution whereby less than 3% by weight is bigger than 500 micron and less than 3% by weight is smaller than 53 micron;
an average particle size of between 175-230 micron;
a mechanical stability of >97%;
a SAOR of less than 40°; and
a dissolution speed of <120 seconds.

3. Spray-dried starch hydrolysate agglomerate product according to claim 2, characterised in that the starch hydrolysate has a dissolution speed of <90 seconds.

4. Spray-dried starch hydrolysate agglomerate product according to claim 1, characterised in that the starch hydrolysate has a DE of between 10 to 22.

5. Method for preparing a spray-dried starch hydrolysate agglomerate product in a spray-drying tower, comprising spraying a liquid material onto a solid powder material, whereby the liquid material is atomised by means of one or more two-fluid nozzles using a fluid for heating and conveying this material, and whereby the agglomerated spray-dried starch hydrolysate is produced by injecting the solid powder material in the top of the drying tower in such a way that the trajectory of the powder crosses the spray pattern of the atomised liquid material, characterised in that the liquid material which is atomised by one or more two-fluid nozzles is a starch hydrolysate solution, whereby this starch hydrolysate solution is atomised using steam as said fluid.

6. Method according to claim 5, characterised in that the starch hydrolysate solution has a concentration of 50-75% dry matter.

7. Method according to claim 6, characterised in that the starch hydrolysate solution has a concentration of 65-75% dry matter.

8. Method according to claim 5, characterised in that the steam has a pressure between 7 and 15 bar.

9. Method according to claim 5, characterised in that the weight ratio of steam versus starch hydrolysate solution is within the range of 0.05 and 0.4.

10. Method according claim 9, characterised in that the weight ratio of steam versus starch hydrolysate solution is within the range of between 0.1 and 0.3.

11. Method according to claim 5, characterised in that heated air is introduced in the spraying tower at a temperature between 160 and 300° C.

12. Method according to claim 11, characterised in that the heated air which is introduced in the spraying tower at a temperature between 180 and 250° C.

13. Method according to claim 5, characterised in that at the bottom of the spraying tower air is exited which has a temperature between 80 and 125° C.

14. Method according to claim 13, characterised in that the exiting air has a temperature between 90 and 120° C.

15. Method according to claim 5, characterised in that the ratio between the solid powder and the starch hydrolysate solution is between 0.6 and 1.1 on a dry weight basis.

16. Method according to claim 15, characterised in that the ratio between the solid powder and the starch hydrolysate solution is between 0.8 and 1.0 on a dry weight basis.

17. Method according to claim 5, characterised in that the dry powder is a starch hydrolysate powder.

18. Method according to claim 17, characterised in that the starch hydrolysate powder is a spray-dried form of the starch hydrolysate solution.

19. Method according to claim 5, characterised in that the agglomerated spray-dried starch hydrolysate particles is brought into a fluidised bed.

* * * * *

UNITED STATES PATENT AND TRADEMARK OFFICE
CERTIFICATE OF CORRECTION

PATENT NO. : 7,819,977 B2  
APPLICATION NO. : 10/590019  
DATED : October 26, 2010  
INVENTOR(S) : Helena Vanhoutte et al.

It is certified that error appears in the above-identified patent and that said Letters Patent is hereby corrected as shown below:

Title Page,

Item (73) Assignee, should read:

Syral Belgium nv, Aalst (BE)

Signed and Sealed this
Twenty-fifth Day of March, 2014

Michelle K. Lee
*Deputy Director of the United States Patent and Trademark Office*